United States Patent
Hibbard et al.

(10) Patent No.: US 9,388,789 B2
(45) Date of Patent: Jul. 12, 2016

(54) SECTIONAL WIND TURBINE BLADE

(75) Inventors: Paul Hibbard, Singapore (SG); Mark Hancock, Southampton (GB)

(73) Assignee: Vestas Wind Systems A/S, Aarhus N. (DK)

( * ) Notice: Subject to any disclaimer, the term of this patent is extended or adjusted under 35 U.S.C. 154(b) by 905 days.

(21) Appl. No.: 13/513,002

(22) PCT Filed: Dec. 2, 2010

(86) PCT No.: PCT/EP2010/068712
§ 371 (c)(1),
(2), (4) Date: May 31, 2012

(87) PCT Pub. No.: WO2011/067323
PCT Pub. Date: Jun. 9, 2011

(65) Prior Publication Data
US 2012/0269643 A1 Oct. 25, 2012

Related U.S. Application Data

(60) Provisional application No. 61/265,978, filed on Dec. 2, 2009.

(30) Foreign Application Priority Data

Dec. 2, 2009 (DK) .................................. 2009 70240

(51) Int. Cl.
*F03D 1/06* (2006.01)

(52) U.S. Cl.
CPC ............ *F03D 1/0683* (2013.01); *F03D 1/0675* (2013.01); *F05B 2240/302* (2013.01); *Y02E 10/721* (2013.01); *Y02P 70/523* (2015.11); *Y10T 29/49316* (2015.01)

(58) Field of Classification Search
CPC ... F03D 1/0683; F03D 1/0675; F03D 1/0633; F03D 1/0641; F05B 2230/604; F05B 2240/302; F05B 2280/4003; F05B 2280/4004; F05B 2280/4005; F05B 2280/4009; Y02E 10/721; Y10T 29/49316; Y02P 70/523
See application file for complete search history.

(56) References Cited

U.S. PATENT DOCUMENTS 2,259,247 A 10/1941 Domier
4,120,998 A 10/1978 Olez
(Continued)

FOREIGN PATENT DOCUMENTS

CA 1151072 A1 8/1983
DE 102007020439 A1 10/2007
(Continued)

OTHER PUBLICATIONS

Office Action and Search Report from Danish Patent and Trademark Office issued in counterpart Danish Application No. PA 2009 70240, mailed on Jul. 2, 2010 (6 pages).
(Continued)

*Primary Examiner* — Craig Kim
*Assistant Examiner* — Wayne A Lambert
(74) *Attorney, Agent, or Firm* — Wood, Herron & Evans, LLP

(57) ABSTRACT

The invention relates to a sectional blade for a wind turbine, the blade comprising at least a first blade section and a second blade section extending in opposite directions from a blade joint, where each blade section comprises a spar section forming a structural member and extending in the longitudinal direction of the blade, and where the first and second blade sections are connected by fastening means restraining any movement of the first blade section relative to the second blade section length ways. The first and the second blade sections are structurally connected by a spar bridge protruding from one of the blade sections and terminating axially in an end portion, which is received in the spar section of the other blade section. The spar bridge and the spar section have interlocking shapes by which rotation of the spar bridge in the spar section is prevented thereby preventing rotation of one of the blade sections relative to the other. Further, the spar section of the other blade section comprises a receiving section extending from the blade joint and inwards into the spar section of that blade, which receiving section holds the spar bridge such that movement of the end portion of the spar bridge relative to the receiving section is enabled in the longitudinal direction. The invention further relates to a method of manufacturing a sectional blade as mentioned above.

22 Claims, 10 Drawing Sheets

(56) References Cited

U.S. PATENT DOCUMENTS

| | | | |
|---|---|---|---|
| 4,429,579 A | | 2/1984 | Wilhelm |
| 4,474,536 A | * | 10/1984 | Gougeon ............ F03D 1/0675 144/346 |
| 5,129,787 A | | 7/1992 | Violette et al. |
| 6,514,043 B1 | * | 2/2003 | Rasmussen et al. ...... 416/134 A |
| 6,619,918 B1 | | 9/2003 | Rebsdorf |
| 6,638,466 B1 | | 10/2003 | Abbott |
| 7,186,086 B2 | * | 3/2007 | Yoshida ................ 416/146 R |
| 7,246,991 B2 | | 7/2007 | Bosche |
| 7,334,989 B2 | * | 2/2008 | Arelt .............................. 416/2 |
| 7,591,621 B1 | * | 9/2009 | Landrum et al. ............... 410/45 |
| 7,854,594 B2 | * | 12/2010 | Judge ........................ 416/226 |
| 7,922,454 B1 | * | 4/2011 | Riddell ...................... 416/224 |
| 7,976,275 B2 | * | 7/2011 | Miebach et al. ............... 416/61 |
| 8,100,660 B2 | | 1/2012 | Vronsky et al. |
| 8,167,569 B2 | | 5/2012 | Livingston |
| 8,171,633 B2 | | 5/2012 | Zirin et al. |
| 8,177,515 B2 | | 5/2012 | Hibbard |
| 8,221,085 B2 | | 7/2012 | Livingston et al. |
| 8,376,713 B2 | * | 2/2013 | Kawasetsu et al. ........... 416/226 |
| 8,510,947 B2 | * | 8/2013 | Kirkpatrick et al. ....... 29/889.71 |
| 2003/0138290 A1 | * | 7/2003 | Wobben ..................... 403/293 |
| 2005/0013694 A1 | * | 1/2005 | Kovalsky ............... B64C 27/46 416/226 |
| 2005/0175457 A1 | | 8/2005 | Yoshida |
| 2007/0025856 A1 | * | 2/2007 | Moroz .................... 416/223 R |
| 2007/0253824 A1 | | 11/2007 | Eyb |
| 2008/0069699 A1 | * | 3/2008 | Bech ....................... 416/229 R |
| 2008/0145231 A1 | * | 6/2008 | Llorente Gonzales et al. ........................ 416/243 |
| 2008/0219851 A1 | | 9/2008 | Althoff et al. |
| 2009/0068017 A1 | * | 3/2009 | Rudling .................... 416/219 R |
| 2009/0072088 A1 | | 3/2009 | Ashton et al. |
| 2009/0116962 A1 | * | 5/2009 | Pedersen et al. ............... 416/31 |
| 2009/0136355 A1 | * | 5/2009 | Finnigan et al. ............. 416/226 |
| 2009/0155084 A1 | * | 6/2009 | Livingston et al. ....... 416/223 R |
| 2009/0169390 A1 | | 7/2009 | Nies |
| 2010/0272570 A1 | * | 10/2010 | Arocena De La Rua et al. ........................ 416/146 R |
| 2011/0020126 A1 | | 1/2011 | Glenn et al. |
| 2011/0052403 A1 | * | 3/2011 | Kawasetsu et al. ........... 416/226 |
| 2011/0158788 A1 | * | 6/2011 | Bech .................... F03D 1/0675 415/1 |

FOREIGN PATENT DOCUMENTS

| | | | |
|---|---|---|---|
| DE | 60312816 T2 | | 2/2008 |
| DE | 102008055540 A1 | | 6/2009 |
| EP | 1500814 A1 | | 1/2005 |
| EP | 1584817 A1 | | 10/2005 |
| EP | 1878915 A2 | | 1/2008 |
| EP | 1950414 A2 | | 7/2008 |
| GB | WO 2009135902 A2 | * | 11/2009 ............ F03D 1/0675 |
| JP | 2003214322 A | | 7/2003 |
| JP | 2004011616 A | | 1/2004 |
| JP | 2005147086 A | | 6/2005 |
| JP | 2005240783 A | | 9/2005 |
| WO | 2006002621 A1 | | 1/2006 |
| WO | 2006005944 A1 | | 1/2006 |
| WO | 2006056584 A1 | | 6/2006 |
| WO | 2008012615 A2 | | 1/2008 |
| WO | 2009034291 A2 | | 3/2009 |
| WO | WO 2009234291 | * | 3/2009 |
| WO | WO 2009059604 A1 | * | 5/2009 |
| WO | 2009090537 A2 | | 7/2009 |
| WO | 2009135902 A2 | | 11/2009 |

OTHER PUBLICATIONS

International Search Report from counterpart PCT Application No. PCT/EP2010/068712 mailed Oct. 11, 2011 (3 pages).
International Preliminary Report on Patentability from counterpart PCT Application No. PCT/EP2010/068712 mailed Mar. 12, 2012 (7 pages).
U.S. Patent and Trademark Office, final Office Action issued in U.S. Appl. No. 12/991,370 dated May 12, 2016.
European Patent Office, Communication of a Notice of Opposition issued in Application No. 09742120.0 dated Jun. 26, 2014.
Design, Structural Testing, and Cost Effectiveness of Sectional Wind Turbine Blades (Publishable Final Report), Publishable Final Report, Aug. 1, 1997-Nov. 30, 2000, Research funded in part by the European Commission in the framework of the Non-Nuclear Energy Programme, Joule III.
U.S. Patent and Trademark Office, Office Action issued in U.S. Appl. No. 12/991,370 dated Sep. 2, 2015.
U.S. Patent and Trademark Office, final Office Action issued in U.S. Appl. No. 12/991,370 dated Jan. 27, 2015.
David Biloen; International Search Report issued in priority International Application No. PCT/EP2009/061180; Nov. 4, 2010; 6 pages; European Patent Office.
Carsten Nielsen; 1st Technical Examination Report issued in priority Denmark Application No. PA 2008 01208; Apr. 15, 2009; 4 pages; Denmark Patent and Trademark Office.
U.S. Patent and Trademark Office, Office Action issued in U.S. Appl. No. 13/060,744; Sep. 3, 2013; 23 pages.
U.S. Patent and Trademark Office, Final Office Action issued in U.S. Appl. No. 13/060,744; Feb. 27, 2014; 22 pages.
U.S. Patent and Trademark Office, Final Office Action issued in U.S. Appl. No. 13/060,744; Mar. 28, 2014; 23 pages.
U.S. Patent and Trademark Office, Office Action issued in U.S. Appl. No. 12/991,370 dated Apr. 29, 2014.
Danish Patent and Trademark Office, Search Report issued in Application No. PA 2008 00649 dated Dec. 17, 2008.
European Patent Office, International Search Report issued in International Application No. PCT/EP2009/055541 dated Mar. 30, 2010.

* cited by examiner

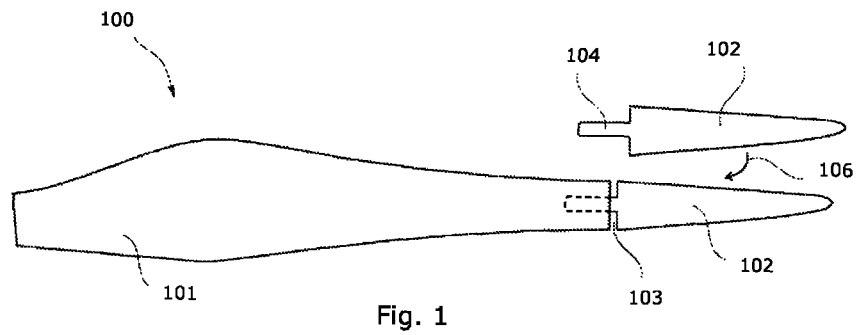
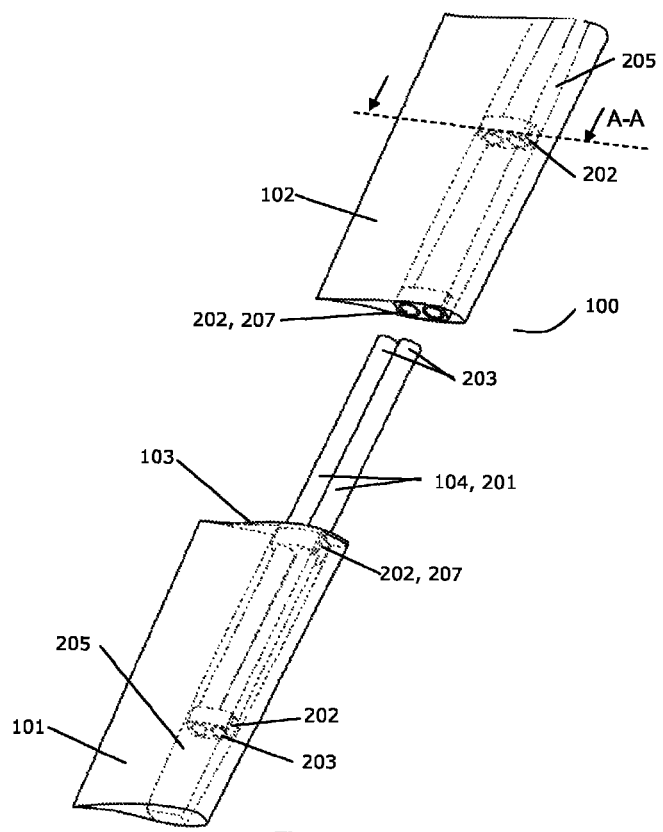
Fig. 1
Fig. 2

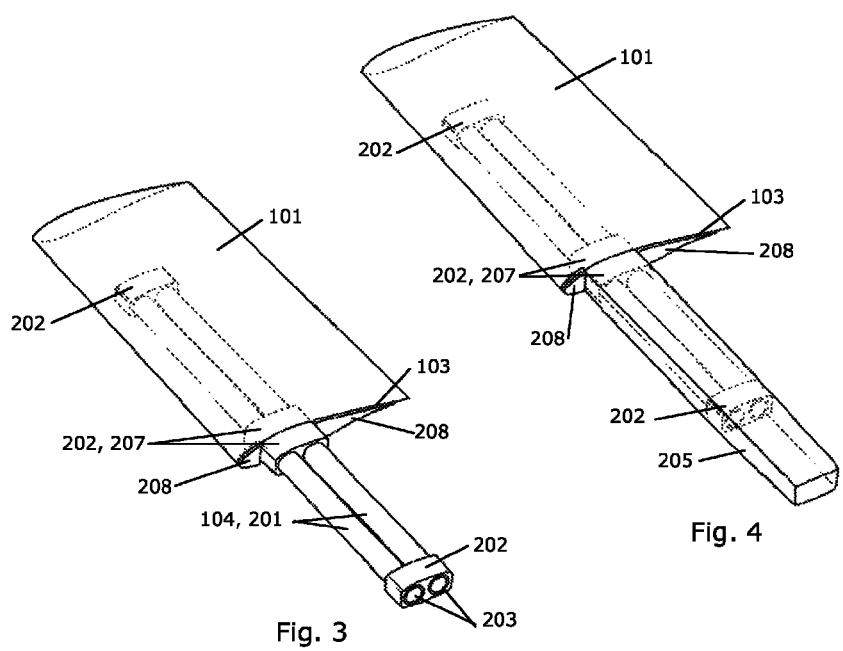
Fig. 3
Fig. 4
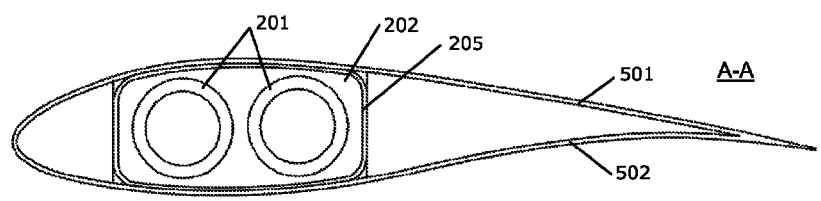
Fig. 5

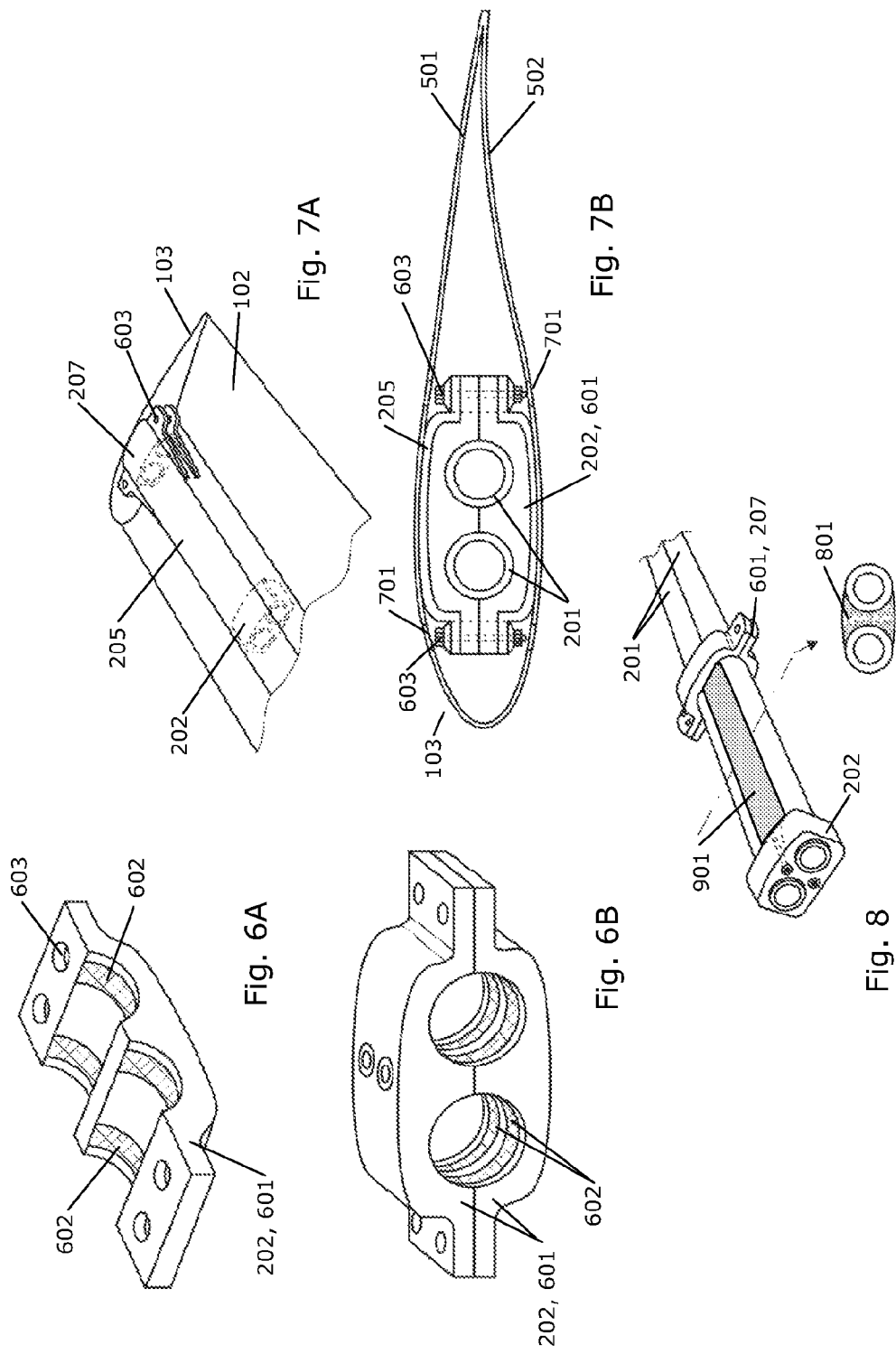

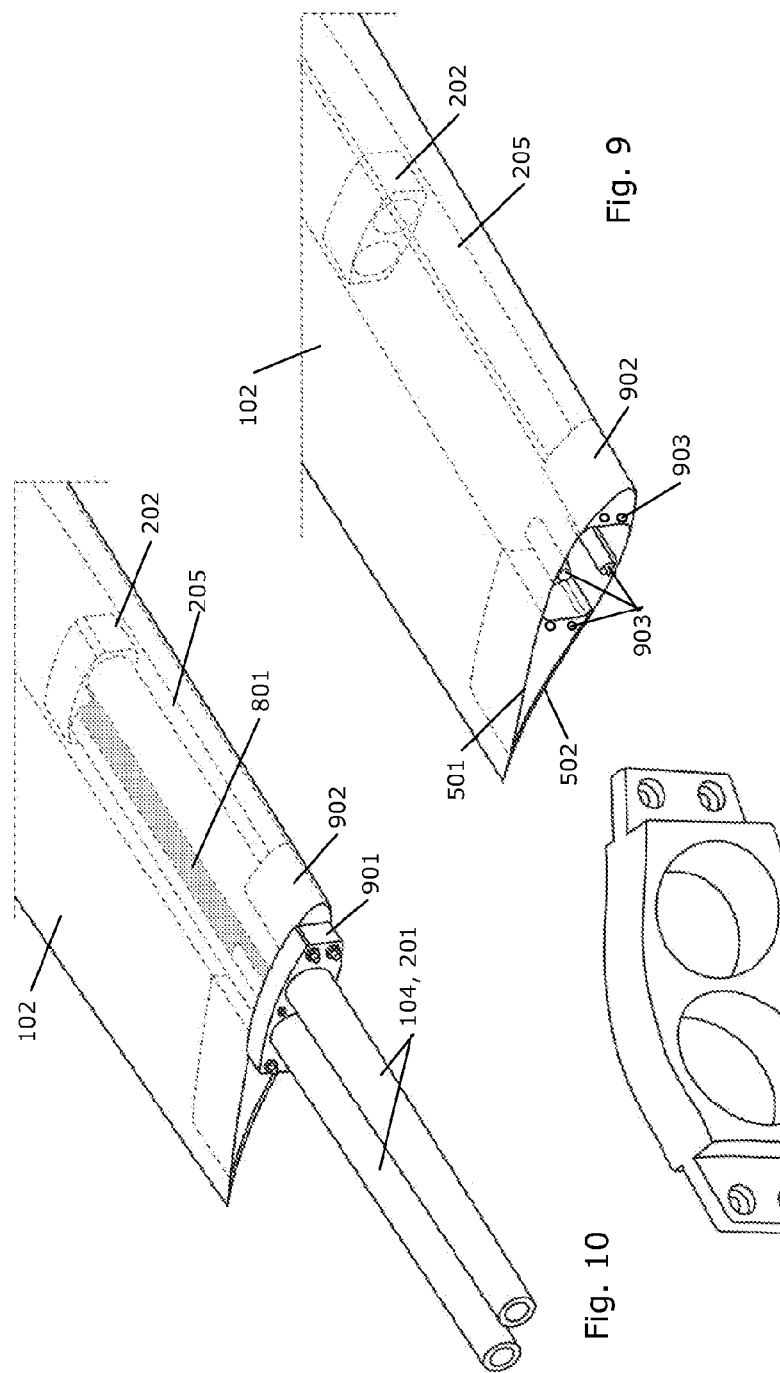

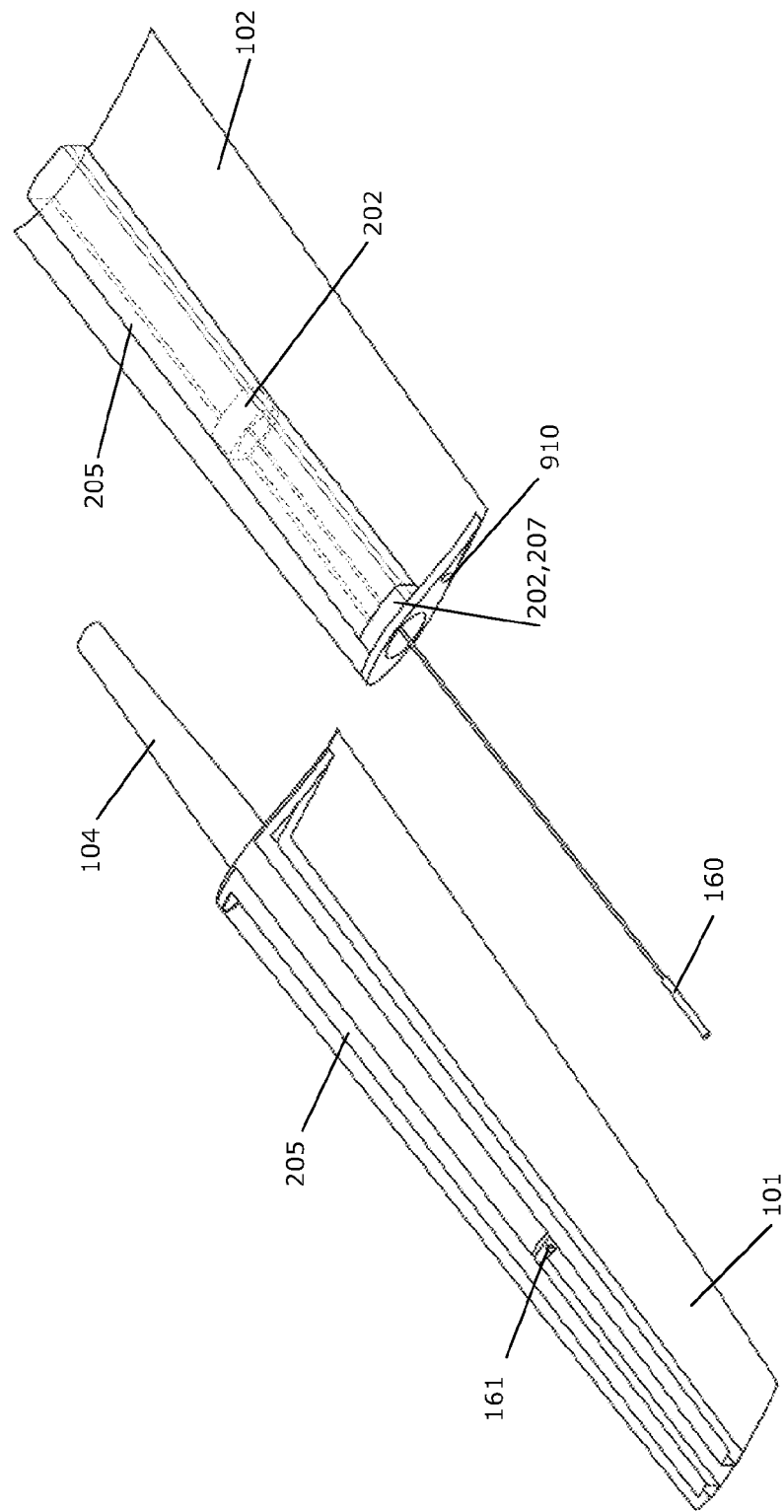

SECTIONAL WIND TURBINE BLADE

FIELD OF THE INVENTION

The present invention relates to a sectional blade for a wind turbine, the blade comprising at least a first and a second blade section extending in opposite directions from a blade joint and being structurally connected by a spar bridge.

BACKGROUND

Modern wind turbines comprise a plurality of wind turbine rotor blades, typically three blades, each blade having a weight of up to 15 tons and a length of up to 55 meters or longer.

Traditionally, a blade comprises two shell parts, one defining a windward side shell part and the other one defining a leeward side shell part. Each of the shell parts are traditionally made in one piece. To reinforce such a blade, a beam- or box-shaped, tubular, and longitudinal element, i.e. a spar, can act as a reinforcing beam running lengthways, i.e. in the longitudinal direction of the blade. The spar is located in the cavity between the two wind turbine shell parts and extends substantially throughout the length of the shell cavity in order to increase the strength and stiffness of the wind turbine blade. A blade may further be reinforced by two or more spars placed lengthways side by side.

During operation of the wind turbine, each wind turbine blade is exposed to considerable loads and moments both in the longitudinal direction of the blade mainly resulting from centrifugal forces, in the flapwise direction dominated by flapwise bending moments from aerodynamic thrust loads, and in the edgewise direction mainly from edgewise gravity dominated loads acting on the blade.

As the size of wind turbines and thus wind turbine blades are still growing, the production facilities and the transport means must be increased to handle blades of the required size. This also increases the demand on logistics and increases the associated costs.

Wind turbine blades manufactured in parts for later joining are known, however with major problems on obtaining the necessary strength of the joints between the connected blade parts and for safely transfer of the loads and moments across the joint. Further, difficulties may arise in designing and making the blade joints without jeopardizing the stiffness and weight considerations on the blades.

DESCRIPTION OF THE INVENTION

It is an object of embodiments of the present invention to provide an improved wind turbine blade comprising at least two blade sections and to provide an improved method of manufacturing such a blade.

In a first aspect, the invention provides a sectional blade for a wind turbine, the blade comprising at least a first blade section and a second blade section extending in opposite directions from a blade joint, where each blade section comprises a spar section forming a structural member of the blade and extending in the longitudinal direction of the blade, the first and second blade sections being connected by fastening means arranged to restrain movement of the first blade section relative to the second blade section in the longitudinal direction of the blade. The first blade section and the second blade section are further structurally connected by a spar bridge protruding from one of the blade sections and terminating axially in an end portion which is received in the spar section of the other blade section, the spar bridge and the spar section having interlocking shapes by which rotation of the spar bridge in the spar section is prevented thereby preventing rotation of one of the blade sections relative to the other blade section. Further, the spar section of the other blade section comprises a receiving section extending from the blade joint and inwards into the spar section of that blade, and the receiving section holds the spar bridge such that movement of the end portion of the spar bridge relative to the receiving section is enabled in the longitudinal direction.

In the context of the present invention the term "spar bridge" shall be understood as a member extending between two neighboring blade sections which member serves the function of interconnecting the two blade sections and which serves the purpose of joining the two sections. The spar bridge may form part of the longitudinal strength and bending stiffness of the wind turbine blade, thus being part of the reinforcement of the blade.

The spar bridge may be a longitudinal element or shaft which may be box-shaped, cylindrical, or of any other shape such as e.g. an I-beam shape or quadrangular suitable for interlocking with the receiving spar section. The cross-sectional shape of the spar bridge in a direction transverse to the spar bridge and/or the sectional blade may be non-uniform e.g. defining only one or even no line of symmetry and may be of any non-circular shape such as oval, elliptic, or polygonal e.g. triangular or quadrangular. Furthermore, the spar bridge may be a solid, a partly solid, or a tubular element. In the context of the present invention, the term "tubular element" shall be understood as a hollow element with an elongated shape. In case of a tubular element, the inner geometry may be different from the outer shape, e.g. defining a tubular element in the form of an elongated non-circular ring of an arbitrary shape.

Each blade section may comprise two or more shell parts, defining a windward and a leeward side shell part. These shell parts may be assembled before joining the first and second blade sections. When assembled, the first blade section and the second blade section are structurally connected by the spar bridge extending into both blade portions to facilitate joining of the blade sections and by the fastening means restraining movement of the first blade section relative to the second blade section in the longitudinal direction of the blade, e.g. withstanding centrifugal forces in the blades during operation of the wind turbine.

The blade may comprise more than one joint and thus comprise more than two blade sections and more than one spar bridge for each joint.

The spar sections may have an elongated form and may be hollow. The spar sections may be optimised both for a dominant flapwise bending moment from aerodynamic thrust loads and for the lesser edgewise gravity dominated loads.

As blade sections may be smaller than normal blade shells, the blade sections may be easier to transport from a manufacturing site to an assembly site for being assembled compared to blades in one piece. Furthermore, the assembly site can be situated close to the place where the turbine blade it to be used. By manufacturing the blade of different parts, these parts may be transported unassembled, thereby facilitating transport with the possibility of reducing the associated costs.

Further, the possibility to manufacture the turbine blade in sections may reduce the manufacturing costs in that the blade mould sizes may be correspondingly reduced and thereby the demands to the space required during manufacture as well as to the equipment for moving around and handling the blade sections and moulds.

By a sectional blade as described above is obtained that the blade sections are held together and the outer blade section prevented from flying off during operation by the fastening means acting to restrain the movement of the first blade section relative to the second blade section in the longitudinal direction of the blade.

The fastening means may comprise bolts, rivets or the like arranged across the blade joint. Further, the fastening means may comprise a tension member such as a wire arranged to provide tension in the longitudinal direction of the blade between the first blade section and the second blade section to establish a pre-tensioned connection between the blade sections. The tension member may be arranged on either or both sides of the spar. Alternatively or additionally, the tension member may be arranged to run in the interior of the spar and for example being fastened to the interior of the receiving sections in both ends. Further, the blade sections may be connected longitudinally at the blade joint by means of adhesive.

By structurally connecting the blade sections by means of a spar bridge is obtained that the spar bridge takes up and helps to transfer the bending loads and moments across the blade joint from the one blade section to the other. This is further ensured by the spar bridge being received in the receiving spar section forming a structural member of the blade. Loads and moments are hence transferred form one blade section via the spar bridge into the structurally reinforced part of the other blade section capable of carrying the loads.

Most often, it is desirable to match the stiffness of the two blade sections in order to obtain a smooth and continuous transition across the blade joint. However, this may in practice be very difficult or even impossible to realize within material and manufacturing tolerances, which consequently when loaded will cause the two halves to deform differently. Rather than needing to try and match the stiffness of the two blade sections, the present invention is based on the principle of making a joint where such stiffness differences are not detrimental. This is obtained by the receiving section holding the spar bridge such that movement of the end portion of the spar bridge relative to the receiving section is enabled in the longitudinal direction, whereby a certain degree of freedom is built into the spar joint. Hereby any local loads and moments concentrations in the connection zones between the spar bridge and the receiving spar section may be minimized. Such local loads concentrations may otherwise be unmanageably large in traditional joints such as tube-in-tube joints or scarf joints, where the parts are bonded or bolted firmly to each other, due to the aforementioned inevitable differences in stiffness and thereby deformations of the two blade sections.

Thus, the spar joint according to the invention is advantageous by providing a compliancy for accommodating the differences in stiffness and thereby resulting differences in deformations, radii of curvature, and angular misalignments between the two blade sections, and between the spar bridge and the receiving spar section.

Also, the spar joint according to the invention is advantageous by providing a compliancy for accommodating slight misalignments or inaccuracies of the positioning of the spar bridge relative to the receiving section originating from the outset e.g. due to manufacturing or material tolerances, or during operation due to setting or displacement of the structural parts of the blade joint.

The receiving spar section may define a longitudinally extending cavity into which the spar bridge may extend. In one embodiment, the cavity extends along the entire length of the blade section, whereas the cavity in other embodiments only extends through a part of the blade section.

The spar bridge may hereby be connected to the receiving spar section in a box-in-box like joint type where the spar bridge is received and inserted in a hollow spar section, but where the spar bridge however to some extent is free to move longitudinally within the spar section.

The rotational movement of the one blade section relative to the other is restrained by the spar bridge and the spar section having interlocking shapes. This may for instance be realized by a box-shaped or non-circular spar bridge to be inserted into and received by a spar section of a similar however slightly enlarged cross sectional shape.

According to an embodiment of the invention, the receiving section forms contact with the spar bridge over a first contact section and forms distance to the spar bridge over a second non-contact section. Hereby is obtained that the spar bridge is not in contact with the receiving spar section along its entire length which allows it further to deform without inducing contact forces to the receiving section over the non-contact section. The first contact section may be positioned close to or such as to comprise the end portion of the spar bridge such as to support the spar bridge at or near its end. The second non-contact section may extend the whole length or part of the length between the first contact section and the blade joint. The first contact section may further be formed closer to the blade joint thereby allowing the end portion of the spar bridge to deform freely on the other side of the contact section.

The receiving section may further hold and form contact with the spar bridge over a number of contact sections at intervals down the length of the spar bridge thereby increasing the stiffness of the spar joint. Further, multiple contact sections may increase the transfer of especially the bending loads over the joint length, while still avoiding rigidly connecting the spar bridge to the spar section.

According a further embodiment of the invention, the receiving section holds the spar bridge via at least one bearing member such as e.g. a bushing, a plain, sliding, or e.g. a fluid or a flexure bearing. Bushings or plain bearings may be advantageous in being easy to pre-manufacture at low costs and easy to insert into the receiving spar section during manufacture of the blade or during assemblage of the blade sections. Bushings or bearings of the aforementioned types may furthermore be advantageous in providing a strong and durable connecting means for holding the spar bridge capable of transferring and withstanding the loads from the spar bridge during bending and deformation of the blade,—loads which may be considerable of size. The spar bridge may for instance comprise one or more shafts inserted into one or more bushing such that the shafts are allowed to move in their longitudinal direction and such that a certain amount of compliancy is provided in the joint to accommodate any angular misalignments between the spar bridge and the bushing and avoiding or reducing the risk of load concentrations in the joint.

In a further embodiment the at least one bearing member is provided in proximity of an end of the spar bridge. Hereby is obtained that the full length of the spar bridge is exploited in transferring the loads from the one blade section via the spar bridge to the other blade section, whereby the bending and twisting loads and moments may be transferred further into the receiving blade portion.

In a further embodiment the at least one bearing member is provided in proximity to the blade joint thereby holding the spar joint when entering the receiving blade section. Hereby the movement of one blade section end relative to the other is minimized at least in the region near the spar bridge and in the plane transverse to the spar bridge length. Furthermore the bearing member may be used for connecting the two blade sections lengthways in the blade joint e.g. by comprising bores or threads for bolts or the like, or by acting as connection surface to be bonded to a corresponding part in the other blade section.

Furthermore, the receiving section may hold the spar bridge via a number of bearing members provided at intervals inwards into the spar section of that blade. The bearing members may be placed at substantially regular intervals, at smaller intervals closer to the end portion of the spar bridge, or at smaller intervals closer to the blade joint. Hereby the transfer of the loads from the spar bridge via the bearing members to the receiving section may be tailored to the specific blade design at hand.

The bearing member may according to the invention comprise a liner material such as e.g. a thermoplastic as Ekonol, PTFE, or polyethylene. These are advantageous in being relatively inexpensive and in providing contact surfaces of low friction in the bearing member. Further, angular misalignments and limited relative movements may be taken up by the liner material via small fretting-like movements or via small clearances between the liner material and the spar bridge. The bearing member may further be renewed simply by replacing or exchanging the liner material. The liner material may be arranged as one or more strips of liner material placed in annular grooves in the bearing.

According to a further embodiment of the invention, the bearing member may comprise an elastic material such as e.g. an elastomer, polyurethane, or natural rubber. Hereby may be obtained a bearing member both capable of supporting the spar bridge and accommodating any angular misalignments between the spar bridge and the bearing member to some extent by twisting and shearing in the material and to some extent by elastic and/or permanent deformation through squeezing of the material. In one embodiment, the material of the bearing member deforms plastically over time according to the movement and deformations of the spar bridge during operation of the wind turbine, such that the bearing member in time will be deformed to fit the spar bridge hereby further reducing or even removing any load concentrations otherwise arising in the contact section.

Further, the receiving section of one or both blade sections may be prepared for the accommodation of the bearing member and for an optimal transferral of the forces from the spar member being supported in the bearing to the receiving section. In this way the receiving section may at its end next to the blade joint comprise a block acting to reinforce the receiving section. The block may be pre-manufactured and may comprise a laminate stack of a number of fiber reinforced layers oriented transversely to the length direction of the receiving section and the spar as received herein. Hereby, the fibers in the layers of the block are then oriented (in directions transversely and optionally perpendicularly to the length axis of the receiving section and the spar) so that the loads from the bearing are better transferred to fiber ends and carried by the fibers in their principal load carrying direction. Further, the stacks of fibres will act as a very stiff core which can take the local high compression loads that the shaft of the joint exerts on the bearing housing while on the same time not adding significantly to the longitudinal stiffness of the receiving section at the end and of the spar assembly which would otherwise adversely affect the stiffness matching and the bearing wear.

The spar bridge may be manufactured of fiber reinforced composite material such as e.g. of a carbon reinforced material, which may provide a very stiff and strong yet light spar. Further, carbon reinforced composites may often be used in the blade spar sections due to their material properties, in which case a carbon reinforced spar may be advantageous in attempting to match the stiffness of the blade sections thereby reducing the movements of the spar bridge in the bushings or connection sections.

According to a further embodiment of the invention, the spar bridge may comprise at least one shaft of an oval and/or elliptic shaped cross section. Hereby is obtained a spar bridge yielding large both edge- and flap-wise bending stiffness under the constraints given by the available blade cavity space for the placing of the spar bridge. Furthermore, an oval shaft may be fast and simple to manufacture for instance by filament winding. Hereby, it is possible to control both the inner and the outer dimensions within low tolerances. Further, shafts of constant as well as non-constant cross section with high stiffness and strength properties may be manufactured by this method. In case of the spar bridge comprising an oval shaped shaft, the receiving section may be of a corresponding oval shape thereby interlocking with the shaft and preventing the shaft from rotating about its longitudinal axis in the spar joint.

Further, the spar bridge may comprise at tapered portion of decreasing cross sectional area towards an end of the spar bridge. The one or more shafts may be tapered in the longitudinal direction towards one or both of the ends, such as to have a decreasing cross-sectional area closer to one or both ends. Hereby the flexibility of the spar is increased. Further, the tapering may ease the insertion of the one or more shafts into the receiving section(s). Additionally or alternatively the thickness of the spar wall may decrease towards the one or both ends of the spar, thereby similarly acting to increase the flexibility of the spar.

Alternatively or additionally the spar bridge may comprise at least two substantially aligned shafts. By placing the shafts side-by-side both the flap-wise and the edge-wise stiffness of the spar bridge and thereby of the blade across the spar joining zone are increased considerably by simple means and may still be manufactured in simple and effective way e.g. by winding as explained above for an oval-shaped shaft. Further, two or more co-aligned shafts may yield a beam structure capable of carrying the high flap-wise bending loads while on same time allowing for thinner (higher chord to thickness ratio) blades, which may be desirable for aerodynamically reasons.

In case of the spar bridge comprising two or more co-aligned shafts, these may be received in a bushing comprising corresponding openings to the shafts and being positioned in a receiving spar section of a box-like shape. Hereby the assembly of shafts may be prevented from rotating relative to the receiving spar section due to the interlocking shapes.

In a further embodiment of the invention, the sectional blade according to the above additionally comprises a connection member arranged at least partly between two of the shafts and adapted to take up shear and/or compression forces between the shafts. The connection member may be adhered or bonded to the shafts or may otherwise be attached to the shafts. The connection member may be of an I-like cross sectional shape with the caps being rounded to fit the outer contours of the shafts and with a web there in between for taking up the shear and compression forces between the shafts. In this way the connection member causes the two or more shafts to act as one structural element or beam. The connection member may be manufactured by an elastic material such as e.g. a glass or carbon fibre composite, and may for instance be manufactured in any desirable length by pulltrusion of extrusion.

Further, the connection member placed between two co-aligned shafts may act to ensure a substantially uniform distance between the shafts under sideways deformation under which the two shafts therefore deform with different radii of curvature and different longitudinal displacement of the two shaft ends. The different deformation and angular misalignment of the two (or more) shafts, however, may be readily accommodated by the spar connection via the one or more bearing members according to the invention. Also during flapwise bending (in case the shafts are aligned side by side in a chordwise fashion) the shafts may most likely bend and deform slightly differently (for instance due to slight variations in the stiffness of the shafts) which may likewise be accommodated in the spar joint according to the invention.

In a further embodiment according to the above, the connection member is positioned lengthways between the blade joint and the end portion of the spar bridge. Hereby is obtained that the connection member may be held in place lengthways between the blade joint (optionally a bearing member placed near the blade joint) and the bearing member near the end portion of the spar bridge, thereby taking up compression forces in the longitudinal direction of the spar bridge and acting to limit or restrain the longitudinal movement of the shafts within the blade.

According to yet a further embodiment, the sectional blade according to any of the above comprises a spigot or pin element extending across the blade joint and arranged to restrain movements in a plane transverse to the longitudinal direction of the blade, and of the trailing edge of the first blade section relative to the trailing edge of the second blade section. Even though the blade sections are structurally connected by the spar bridge and connected longitudinally by fastening means, parts of the end surfaces of the blade sections at the blade joint may move relative to each other under the complex loading and bending of the blade during operation. By the placing of a spigot is obtained that the trailing edges of the two blade sections may be held together and that the transition from the one blade section to the other across the blade joint is unbroken and with minimal discontinuities. Further the spigot or pin element acts to keep the trailing edge angle across the blade joint. The spigot may be arranged close to the trailing edge or alternatively or additionally close to the leading edge of the one blade section end to be received by a corresponding opening in the other blade section end. The spigot need not to be of such a size as to carry any significant loads, but may simply act to ensure the position of the trailing and/or leading edges across the blade joint. The spigot may for example comprise a pin on an elastic bushing such as a rubber bushing, and may be arranged to be free to slide longitudinally.

The spar bridge may form an integral part of the first spar section, or may form a separate member where each of the first and the second spar sections are adapted to receive the spar bridge so as to hold the spar bridge.

The spar bridge may in one embodiment form an integral part of the first spar section, and the second spar section may be adapted to receive the spar bridge over a spar joint length so as to hold the spar bridge to the second spar section in the spar joint and may thus not be a separate element. Furthermore, the spar bridge may comprise an extension protruding from one of the spar sections and may thereby form an extending spar section. This may be obtained by bonding the spar bridge protruding from the one of the blade sections into the spar section in the one blade section, which yields a simple and effective way to firmly connect the spar bridge to the one blade section e.g. during manufacture of the blade section.

In a further embodiment, the spar bridge may form a separate member, and each of the first and the second spar sections may be adapted to receive the spar bridge so as to hold the spar bridge to the first and second spar sections in spar joints. Hereby, the length of the second blade section is reduced compared to if the spar bridge extends or protrudes here from.

Here, the spar sections of the first and second blade sections may both additionally comprise receiving sections extending from the blade joint and inwards into each of the spar sections, the receiving sections both holding the spar bridge such that movement of each of end portions of the spar bridge relative to the corresponding receiving section is enabled in the longitudinal direction. In this way any local load concentrations in the connection sections of either receiving section are reduced. The spar bridge may be fastened e.g. bolted in the blade joint, or may be only simply supported in both blade sections and enclosed in the two receiving sections.

At least a part of the receiving spar section may form part of an aerodynamically outer surface of the blade. Thus, at least one of the spar sections may not be completely encapsulated within the turbine blade shell parts. Hence, the spar may easier be transported from a manufacturing site to an assembly site compared to large blade shells or complete blades. The assembly site can be situated close to the place where the turbine blade it to be used. Further, less material may be used in the blade design by letting a spar section form part of an aerodynamically outer surface of the blade.

As it may be an advantage if the first and second blade portions can be separated again after joining them, the spar joint may facilitate disassembling and non-destructive separation of the blade sections from each other. This may especially be an advantage if a part of the blade needs repair or has to be replaced, as only the blade portion comprising the part in question needs to be replaced.

The joint may be approximately at the middle part of the blade providing blade sections of approximately the same length. However, the blade portions may also be of different length. As an example, the first blade section may define a main blade portion, whereas the second blade section may define a tip portion. In one embodiment of the invention the second blade section may define a blade tip of the outermost 1-8 m such as 5 m of the blade, where the spar bridge connecting the blade tip to the main blade part may be of e.g. 2-10 m long and protrude between 1-5 m into the main blade part. In one embodiment the spar bridge may be 3-4 m in total and protrude 1.5-2 m from the blade tip.

In an embodiment of the invention the second blade section may form a winglet. Winglets can attain different shapes such as e.g. a sharply bent tip in an angle from a few degrees to 90° relative to the lengthwise direction of the blade, or such as a gradually bent tip. Hereby is obtained that the blade may be transported in parts which may e.g. be relatively flat compared to a traditional blade with winglet, thereby facilitating transport with the possibility of reducing the associated costs.

The blade tip influences the performance of the wind turbine blade as well as the noise emission. By detachable mounting of the winglet to the rest of the blade, is obtained e.g. that the blade tip may by exchanged on existing wind turbines to thereby adjust the wind turbine performance or noise emission by attaching tips extending in different angles relative to the lengthwise direction of the blade or tips of different size and/or shape. Also, as the blade tip is often vulnerable to damage during transport, handling, or operation, a detachable blade tip or winglet according to the above may furthermore be advantageous in facilitating the exchange of a damaged blade tip. The advantages hereof may be the facilitation of transport and the possibilities of retrofitting or repair of the blade tip as described previously.

In a second aspect, the invention provides a method of manufacturing a sectional blade for a wind turbine according to any of the above, the method comprising the steps of:
providing a first blade section and a second blade section;
arranging the blade sections so that they extend in opposite directions from a joint; and
structurally connecting the blade sections by use of a spar bridge.

It should be understood, that the features of the above-described first aspect of the invention may be applicable in relation to steps of the method of the second aspect of the invention.

The sectional blade according to the above may be manufactured for a large part of pre-manufactured and ready made parts.

The sectional blade may in one embodiment be manufactured by first arranging the spar bridge to protrude from the one blade section for instance by bonding the spar bridge into the blade section during lay-up and casting of the blade section. In the case of the spar bridge comprising two co-aligned shafts, the connection member may then be bonded onto the shafts. The spar bridge may then be inserted into the receiving spar section of the other blade part and into the bearing member bonded or otherwise firmly held in place inside the spar section. Then the two blade sections may be fastened to each other primarily in the longitudinal direction of the blade such as to prevent the blade sections to be separated due to centrifugal forces during operation. This may be achieved e.g. by bolting the blade sections to each other at the blade joint or by means of tensioning means such as wires or cables extending across the blade joint. Hereby the sectional blade is assembled apart from any optional finish such as filling any access openings to the bolts in the blade surface, painting etc.

In a third aspect, the invention provides a wind turbine comprising a sectional blade according to the first aspect of the invention. The sectional blade may be manufactured according to the second aspect of the invention. It should be understood, that the features of the first and second aspects previously described may also be applicable to the third aspect of the invention.

BRIEF DESCRIPTION OF THE DRAWINGS

In the following different embodiments of the invention will be described with reference to the drawings, wherein:

FIG. 1 illustrates an embodiment of a sectional blade comprising a first and a second blade section, FIGS. 2-4 illustrate an example of a joint between two blade sections according to the invention, FIG. 5 shows the spar joint connection of shafts in a bearing member in a cross sectional view, FIGS. 6A and B show a bearing member made from two halves, FIGS. 7A and 7B show an embodiment of a bearing member bolted to the spar section in a perspective and a cross sectional view, respectively, FIG. 8 illustrates the shafts inserted into the bearing members and with the connection member in a perspective and a cross sectional view, FIGS. 9 and 10 illustrate an example of a joint between two blade sections according to the invention, FIG. 11 shows a bridging block or connection block.

DETAILED DESCRIPTION OF THE DRAWINGS

Figure 12:
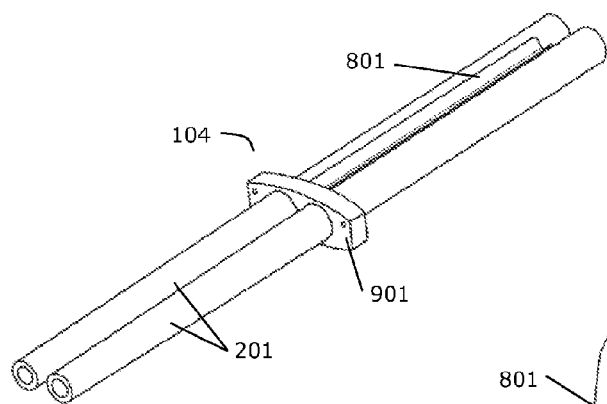
FIGS. 12 and 13 show the spar bridge assemble according to the invention in different views.

Further scope of applicability of the present invention will become apparent from the following detailed description and specific examples. However, it should be understood that the detailed description and specific examples, while indicating preferred embodiments of the invention, are given by way of illustration only, since various changes and modifications within the scope of the invention will become apparent to those skilled in the art from this detailed description.

FIG. 1 shows a sectional blade 100 for a wind turbine according to one embodiment of the invention. The blade 100 comprises at least a first blade section 101 and a second blade section 102 extending in opposite directions from a blade joint 103. The first blade section 101 and the second blade section 102 are structurally connected by at least one spar bridge 104 extending into both blade sections 101, 102 to facilitate joining of said blade sections 101, 102.

The arrow 106 illustrates that the sectional blade 100 in the illustrated embodiment comprises two blade sections 101, 102, and that these blade sections 101, 102 are joined by inserting the spar bridge 104 into the first blade section 101.

The illustrated spar bridge 104 is a longitudinal beam or shaft element. It forms part of the longitudinal strength of the wind turbine blade 100, thus forming part of the reinforcement of the blade 100. Further, the spar bridge 104 in extending into both blade sections acts to carry and transfer bending loads of the blade across the blade joint.

The FIGS. 2-4 illustrate an example of a joint between two blade sections 101, 102 according to the invention. Here, the first blade section 101 comprises the tip of the wind turbine blade 100 which is connected to the main blade part 102 by means of the spar bridge 104 in this embodiment comprising two co-aligned substantially round shafts 201 for carrying the flapwise and edgewise bending loads and moments across the blade joint 103. The shafts 201 may be twin filament wound carbon shafts which in this embodiment act as independent cantilevers. The shafts are supported in both their ends by being fitted into bearing members 202 such as plain bearings or bushings in the receiving spar sections 205 of the blade sections. Hereby, the shafts are supported such that movement of the end portion 203 of the spar bridge 104 relative to the receiving spar section 205 is enabled in the longitudinal direction of the blade. In other words the bearing members allow for small movements between the parts of the blade. Hereby the load concentrations which would otherwise inevitably arise at the contacting zones if the spar bridge was firmly attached to the receiving spar section are considerably reduced if not completely avoided. The bearing members 202 may be attached to or integrally connected to the receiving spar sections 205 which may be seen most clearly in FIG. 4. In the shown embodiments the receiving spar section 205 of the main blade part 102 is box-shaped and the bearing member 202 comprises a correspondingly box-shaped bearing block or bushing with an opening for each shaft 201. In this way the spar bridge 104 and the spar section 205 have interlocking shapes preventing the blade tip from rotating relatively to the main blade part.

The bearing members may comprise e.g. dry plain bearings optionally lined with a thermoplastic liner material such as Ekonol or PTFE. Other types of bearing members may be used like bushings of elastic material such as an elastomer advantageous for capable of taking up and accommodating any angular misalignments between the bushing and the shafts arising during loading and bending or arising due to initially built in misalignments from material and manufacturing tolerances.

In the embodiment shown in FIG. 2, the blade joint arrangement is substantially symmetric. The spar bridge forms a separate member being inserted into receiving spar sections 205 in both blade sections. The spar bridge may alternatively be bonded into the first blade section 101 as illustrated in FIGS. 3 and 4. Here, the spar bridge extend nearly all the way to the tip blade end and acts to form the spar section of the blade tip 101.

The two shafts are furthermore supported at the blade joint 103 by one further bearing member 202, 207 or bushing in each blade section 101, 102. These bushings 207 are likewise firmly attached to the blade sections e.g. by means of adhesives or by being bonded to the blade shells during manufacture hereof.

The two blade sections are connected longitudinally to prevent the blade tip from flying of due to centrifugal forces during operation or gravity forces by fastening means arranged across the blade joint 103. These are not shown in the figures but the fastening may be achieved by bolting the bushings 207 together at the blade joint 103 or by adhesively bonding the bushings 207 and/or parts or the whole end plates 208 of the blade sections together. Alternatively or additionally the tip may be retained tensioning means such as wires.

In FIG. 5 is shown the cross sectional view A-A of the blade through a bearing member 202 and as indicated in FIG. 2. The figure shows the upper and lower blade shells 501, 502 being reinforced by the box-shaped spar section 205. The spar section may be made of fiber reinforced materials such as a Carbon reinforced composite. The spar bridge which is this embodiment comprises two circular shafts 201 are inserted and fitted into the bearing member 202 which in turn is positioned and firmly attached to the inside of the spar section 205.

The bearing member 202 may be in a single part or may be in more parts as sketched in FIGS. 6A and 6B, where the bearing member is manufactured in and assembled from two halves 601. If manufactured in two or more parts, the bearing member may be easier with respect to maintenance and the bearing member of multiple parts bolted together may further be able to take up larger loads. The bearing member may be manufactured by carbon fiber composites to match the stiffness of the shafts. Further, the bearing member comprises liner material 302 of e.g. a PFTE composite or Ekonol. The bearing halves 601 may be assembled by means of bolts 603 and at the same time connected to the spar section 205 as illustrated in FIGS. 7A and 7B. As can be seen in the cross sectional view of FIG. 7B, the bolts 603 may be tightened through openings 701 in the blade shells 501, 502. After assemblage the openings may be filled to re-establish a smooth outer surface of the blade 100.

The bearing member may be assembled and connected to the spar section prior to inserting the shafts 201 or after having inserted the spar bridge in the receiving spar section. In the latter case the spar section and the bearing member 207 next to the blade joint 103 may further be squeezed or tightened around the shafts to obtain a more firm hold reducing any relative movements of the blade sections at the blade joint. The bearing member 207 may tightened around the shafts 201 to such a degree that the two blade sections hereby become longitudinally attached to each other. The end portions of the shafts supported by the bearing member 202, are however still free to move longitudinally relative to the receiving spar section.

FIG. 8 shows the two co-aligned shafts 201 inserted into the bearing member 207 near the blade joint and the bearing member 202 near the end portions of the shafts. The spar sections and blade shells are not shown for clarity. A cross sectional view is inserted in FIG. 8 showing the two shafts 201 and a connection member 801 positioned between the shafts. The connection member 801 takes up primarily shear and compression forces between the shafts during loading making the assembly of the two shafts act as one structural element. The connection member increases the edgewise capacity of the spar bridge and results in reduced bearing wear from edgewise loads. The connection member may be bonded to the shafts or may be loosely placed between the shafts.

In the FIGS. 9 and 10 are shown an embodiment of a sectional blade connection according to the invention in perspective views, prior to and after insertion of the spar bridge into the receiving spar section, respectively. Only the protruding spar bridge 104 and the bridging block or bushing 901 of the first blade section 101 are shown for clarity in FIG. 10. In this embodiment of the invention the spar bridge comprises two substantially circular and coaligned shafts 201 placed side by side in the chordwise direction of the blade. The shafts 201 are here bonded into the first blade section 101 (not shown).

The second blade section 102 which here is the main blade part is pre-manufactured to comprise a bearing member 202 bonded in place inside the receiving box-shaped spar section 205 forming a part of the structural reinforcement of the blade section. Further, a connection block 902 (in one or more parts) is firmly secured to the blade shells 501, 502 forming an end surface of the second blade section for fastening of the blade sections to each other. To this use the connection block comprises a number of threaded bushings 903. In the shown embodiment the connection block has partly a cross sectional shape of an airfoil, but may in other embodiments be box-shaped, optionally of a shape corresponding to the bridging block 901 to which it is to be connected.

During assembly of the two blade sections 101, 102, the shafts are first inserted or guided through the bridging block 901 which may be fastened to the first blade section by being bolting onto the blade shell (not shown). Alternatively or additionally the bridging block may be bonded and cured to the blade shells. Then the connection member 801 is bonded or otherwise attached to the shafts. The spar bridge assemble 104 of the shafts 201, the bridging block 901, and the connection member 801 may be seen in greater details in the FIGS. 12 and 13 in two different perspective views.

The shafts may then be pushed into the receiving spar section 205 and into the bearing member 202 supporting the end portions of the shafts while allowing for small movements between the blade parts as any movement of the end portions of the shafts relative to the receiving spar section is enabled in the longitudinal direction of the blade.

Hereafter, the bridging block 901 may be bolted to the connection block 902 thereby preventing the outer blade section from falling or flying off during operation. Further, the movement in the longitudinal direction of the shafts 201 within the receiving spar section is reduced by the connection member 801 taking up compression loads when being pressed up against the bridging block 901 due to the centrifugal loads on the blade during rotation.

Figure 13:
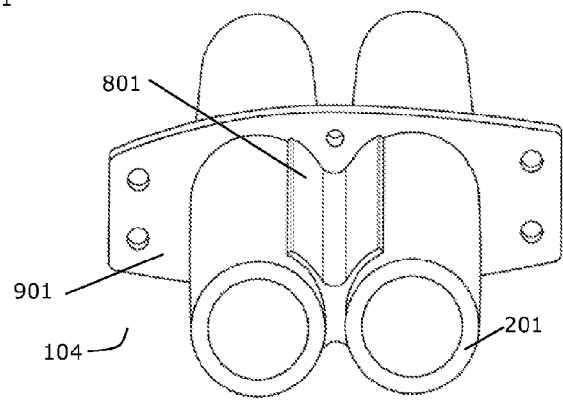

Embodiments of a bridging block 901 or a connection block 902 are shown in greater details in the FIGS. 11 and 13. In FIG. 11 is sketched a bridging block 901 in a deformed stage (the deformations are exaggerated for illustrative purposes) under some combined loadings. The bridging block shown here may be manufactured in one piece.

Figure 14:
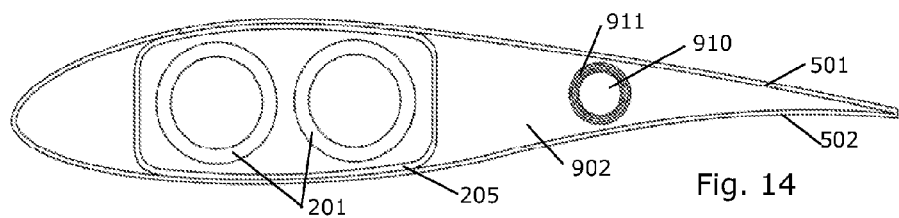
FIGS. 14 and 15 show the blade joint comprising a spigot in a cross sectional and a perspective view, respectively.
Figure 15:
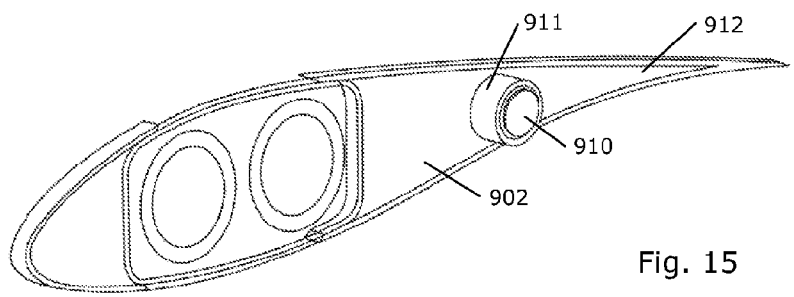

The FIGS. 14 and 15 show the blade joint 103 comprising a spigot 910 in a cross sectional and a perspective view, respectively. The spigot 910 may be arranged to protrude from the one blade section (for instance from the connection or bridging block) and engage with the second blade section to act as a pitch angle locator helping to ensure the pitch angle and the position of the trailing edge 912 across the blade joint. The spigot may comprise a pin 910 in a bushing 911 of a rubber material. The spigot is advantageously positioned close to the trailing edge 912. In one embodiment one or more spigots are bonded to the upper and/or lower blade shells. An alternative or additional spigot may be arranged close to the leading edge for restraining the movement of the leading edge across the blade joint.

Figure 16:
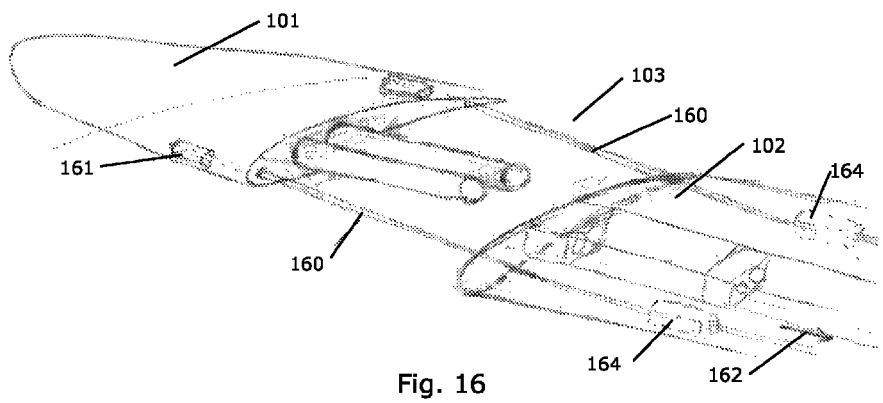
FIGS. 16 and 17 illustrate two ways for joining the sections of the blade longitudinally.
Figure 17:
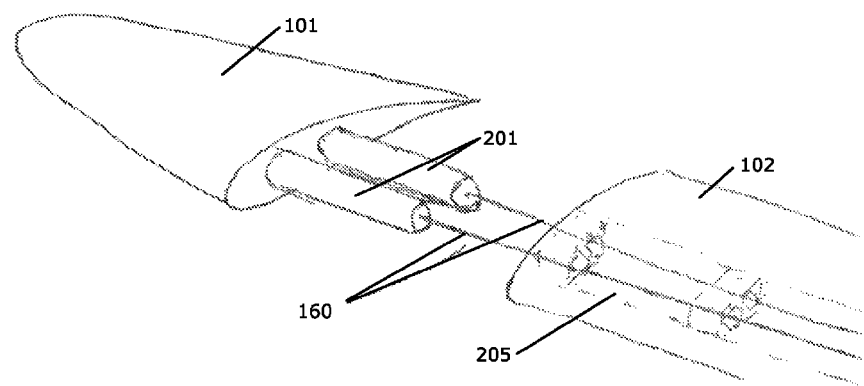

FIGS. 16 and 17 illustrate how the two blade sections 101 and 102 may be fastened to each other by means of tensioning wires 160 placed to restrain the movement of the first blade section relative to the second blade section in the longitudinal direction of the blade. In FIG. 16 the tensioning wires 160 are attached in their one end to end clamp blocks 161 embedded or bonded into the outer blade section 101. The wires extend across the blade joint 103 and run in the length of the blade (162) down to tensioning devices placed in or closer to the blade root (not shown). The wires may be tensioned by means of tension threads and tensioning collars expanding on the wire in connection to blocks bonded into the blade 164. Alternatively or additionally and as sketched in FIG. 17, the tensioning wires 160 may run partly or wholly inside the shafts 201 to which the wires may optionally be bonded into. Here, the tensioning wires run inside the receiving spar section 205 down to wire tensioning devices placed closer to the root.

Figure 18:
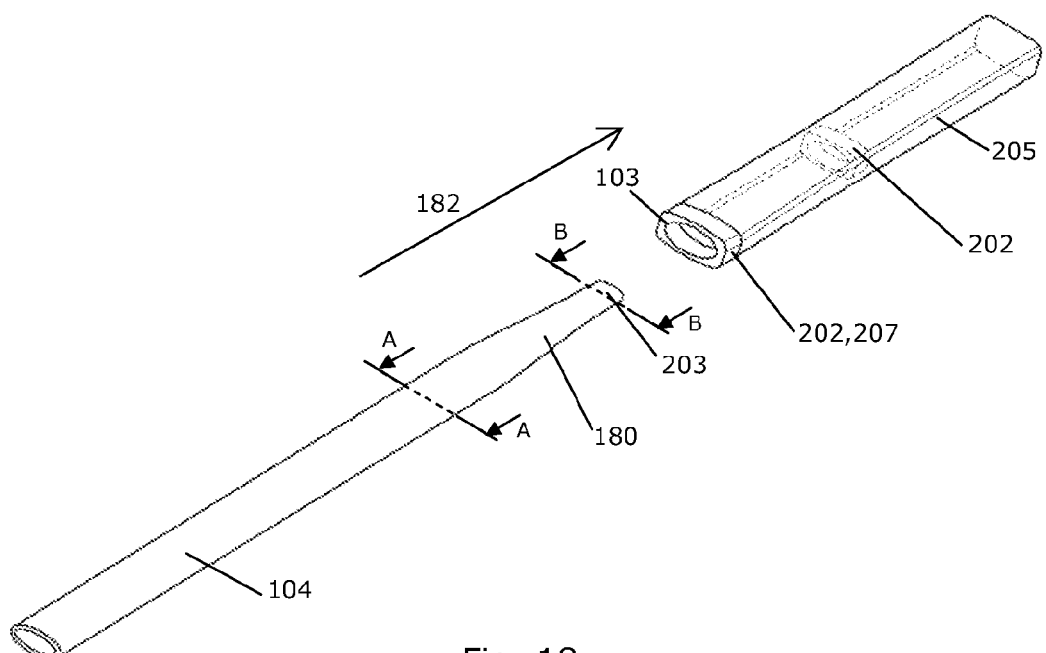
FIG. 18 illustrates a tapered spar member, FIGS. 19A and B show two cross-sectional area of tapered spar, FIGS. 20A and B illustrate an embodiment of a spar joint connection.
Figure 19A:
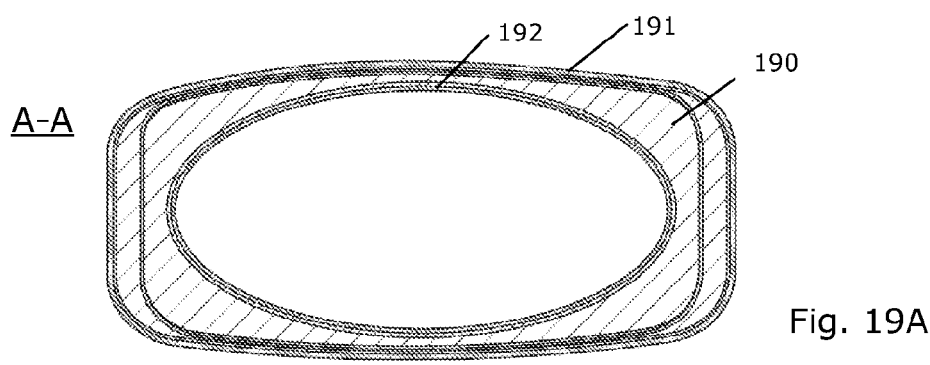
Figure 19B:
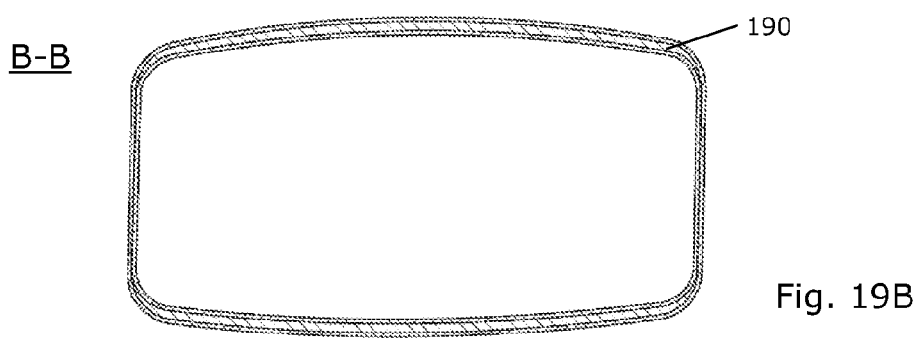

The FIGS. 18-20 illustrate an embodiment of a joint between two blade sections 101, 102 according to the invention, where the spar bridge 104 comprises a shaft of an essentially outer oval or elliptical shape. In FIG. 18 only the shaft 104 and a receiving spar section 205 of one of the blade sections 101 is shown for clarity. The shaft 104 may comprise a tapered section 180. Hereby the cross-sectional area of the shaft reduces towards an end of the shaft thereby increasing the bending flexibility of the shaft. Further, the wall thickness of the spar 104 may be tapered and reduced towards one or both shaft ends. In FIGS. 19A and B are shown the cross-sectional area 190 of the shaft at two locations as shown in FIG. 18. These figures further illustrate how the shaft may comprise different outer and inner shapes and how these may vary along the length of the shaft, in that the outer shape 191 of the depicted shaft is oval although closer to box-shaped, whereas the interior shape 192 is elliptic at a position close the blade joint 103 where the thickness of the shaft walls are greater to accommodate for the higher loads closer to the blade joint.

Figure 20B:
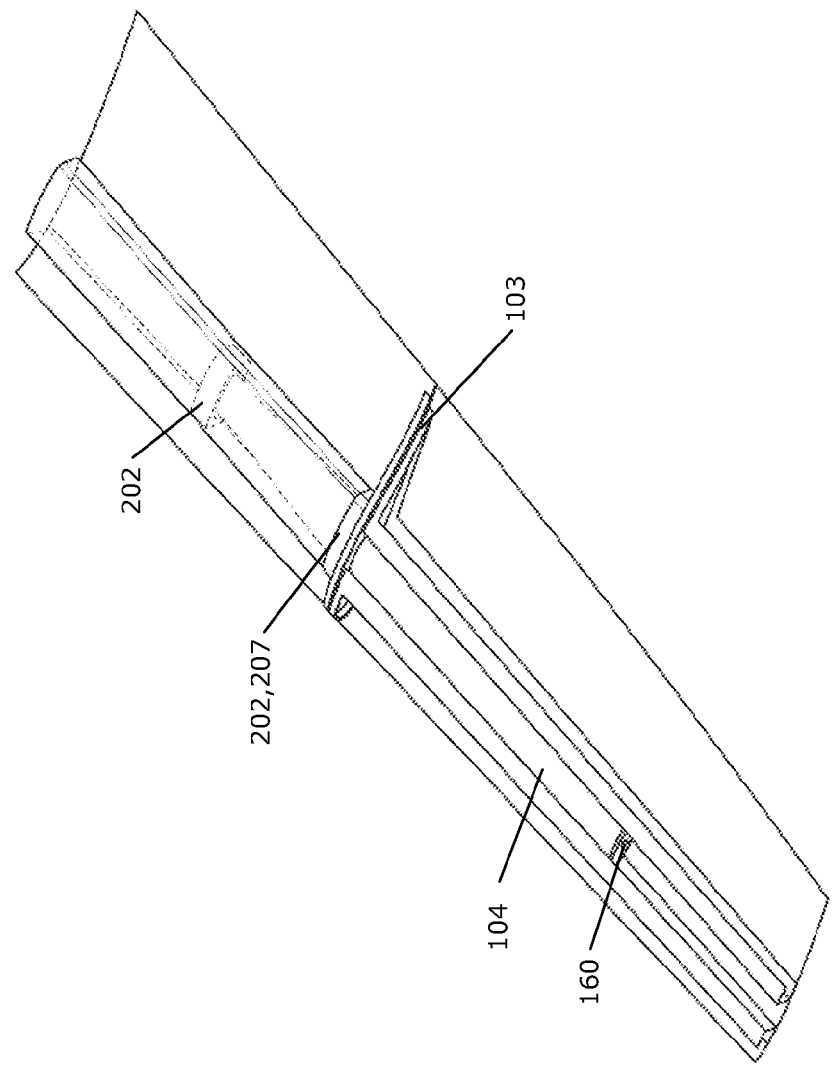

The arrow 182 illustrates how the shaft is inserted and received in the spar receiving section of a blade section (the blade shells not shown). FIGS. 20A and 20B illustrate the blade sections and the spar joint prior to and after assembly of the blade, respectively (with the upper blade shells not drawn for clarity). The shaft 104 is supported in by being fitted into bearing members 202 such as plain bearings or bushings placed in the interior of the receiving spar sections 205. Further, the shaft is supported in one or more central bearings 202, 207 near the blade joint 103. In this way the shaft is supported such that movement of the end portion 203 of the spar bridge 104 relative to the receiving spar section 205 is enabled in the longitudinal direction of the blade. In other words the bearing members allow for small movements between the parts of the blade as also described in relation to the previous figures. The bearing members 202 may be attached to or integrally connected to the receiving spar sections 205.

Further, the FIGS. 20A and 20 B illustrate how the two blade sections 101, 102 may be connected by a tensioning wire 160 arranged in the interior of the hollow shaft 104. The tensioning wire 160 is in this embodiment connected in its one end to a clamp block (not shown) in relation to the bearing member 202 and thereby to the receiving spar section 205. During assembly of the blade, the spar member 104 may first be connected or bonded (embedded?) into the one blade section 101 (in this case the blade tip part). The shaft is then inserted into the receiving spar section and the two blade sections joined. Finally, the two blade sections are fastened to each other by tensioning the tensioning wire and optionally by fastening bolts at the blade joint.

Figure 21:
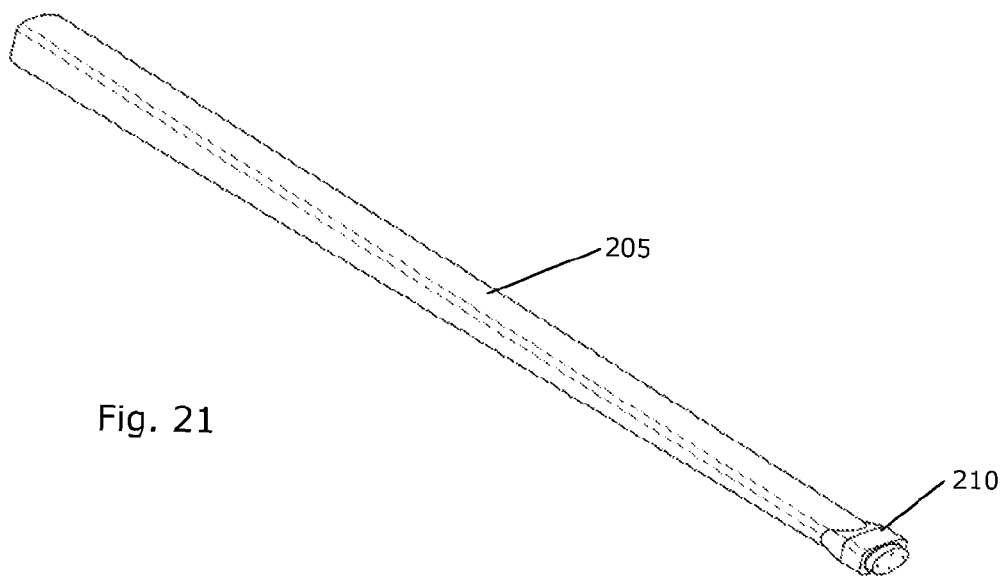
FIGS. 21-23 illustrate embodiments of the receiving section and a spar in a blade section.
Figure 22:
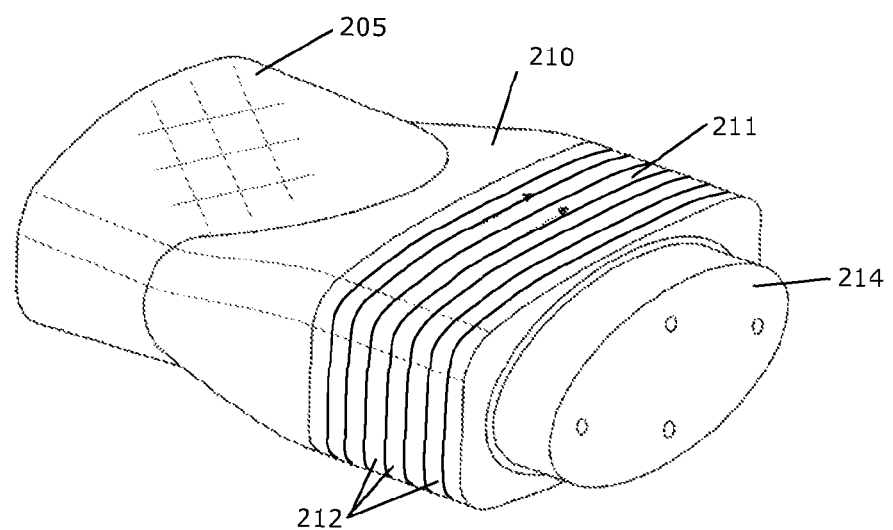
Figure 23:
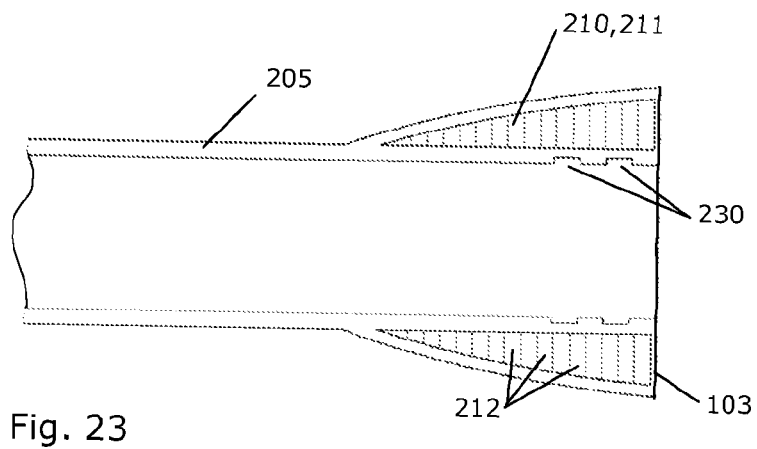

In order to better transfer the loads from the spar member 104 into the receiving spar section 205, the former may in an embodiment comprise an outer reinforcement member or block 210 as illustrated in FIGS. 21-23. The reinforcing block is arranged near the end of the receiving spar section next to the blade joint 103 and in the region comprising the central bearing member 207 for supporting the spar or shaft near the blade joint. FIG. 21 illustrate the spar of a blade section comprising the receiving spar section 205 and the reinforcing block 210 near its end and during manufacture where the receiving spar is manufactured by winding around a mandrel 214. The end portion of the receiving spar section is shown in grater detail in FIG. 22. The block 210 may comprise a laminate stack 211 of a number of fiber reinforced layers 212 oriented transversely to the length direction of the receiving spar section and the spar as received herein. In this way, the fibers in the layers of the block 210 are then oriented (in directions transversely and optionally perpendicularly to the length axis of the receiving section and the spar) so that the loads from the bearing are better transferred to fiber ends and carried by the fibers in their principal load carrying direction. The block may be pre-manufactured optionally in a number of sections to be placed around the receiving spar during manufacture. Thereafter one or more layers of fibers may be wound around the laminate stack.

FIG. 23 illustrate in a cross sectional view a further embodiment of the an end section of a receiving spar section 205 next to the blade joint. The receiving section 205 comprises a reinforcing block 210 as described above of a stack of fiber reinforced layers 212. The stacking direction essentially follows the direction of the length of the receiving spar. The thickness of the reinforcing block 210 increases gradually towards the spar end thereby forming a transition zone. Further, the receiving spar section in this embodiment comprises a number of inner grooves 230 into which a liner material may be placed thereby forming a bearing member for supporting the shaft to be inserted in the receiving spar section.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A sectional blade for a wind turbine, the blade comprising at least a first blade section and a second blade section extending in opposite directions from a blade joint,
   wherein each blade section comprises a spar section forming a structural member of the blade and extending in the longitudinal direction of the blade,
   the first and second blade sections being connected by a fastener arranged to restrain movement of the first blade section relative to the second blade section in the longitudinal direction of the blade,
   the first blade section and the second blade section being structurally connected by a spar bridge protruding from one of the blade sections and terminating axially in an end portion which is received in the spar section of the other blade section,
   the spar bridge and the spar section having interlocking shapes by which rotation of the spar bridge in the spar section is prevented thereby preventing rotation of one of the blade sections relative to the other blade section,
   the spar section of the other blade section comprising a receiving section extending from the blade joint and inwards into the spar section of that blade, and
   the receiving section holding the spar bridge such that movement of the end portion of the spar bridge relative to the receiving section is enabled in the longitudinal direction.

2. The sectional blade according to claim 1, wherein the receiving section forms contact with the spar bridge over a first contact section and forms distance to the spar bridge over a second non-contact section.

3. The sectional blade according to claim 1, wherein the receiving section holds the spar bridge via at least one bearing member.

4. The sectional blade according to claim 3, wherein at least one bearing member is provided in proximity of an end of the spar bridge.

5. The sectional blade according to claim 3, wherein said at least one bearing member is provided in proximity to the blade joint.

6. The sectional blade according to claim 3, wherein the receiving section holds the spar bridge via a number of bearing members provided at intervals inwards into the spar section of that blade.

7. The sectional blade according to claim 3, wherein said at least one bearing member comprises a liner material formed from one of Ekonol, PTFE, or polyethylene.

8. The sectional blade according to claim 3, wherein said at least one bearing member comprises an elastic material formed from one of an elastomer, polyurethane, or natural rubber.

9. The sectional blade according to claim 1, wherein the spar bridge comprises at least one shaft of an oval shaped cross section.

10. The sectional blade according to claim 1, wherein the spar bridge comprises a tapered portion of decreasing cross sectional area towards an end of the spar bridge.

11. The sectional blade according to claim 1, wherein the spar bridge comprises at least two substantially aligned shafts.

12. The sectional blade according to claim 11, further comprising a connection member arranged at least partly between two of said shafts and adapted to take up shear and/or compression forces between the shafts.

13. The sectional blade according to claim 12, wherein the connection member is positioned lengthways between the blade joint and the end portion of the spar bridge.

14. The sectional blade according to claim 1, further comprising a spigot extending across the blade joint and arranged to restrain movements in a plane transverse to the longitudinal direction of the blade, and of the trailing edge of the first blade section relative to the trailing edge of the second blade section.

15. The sectional blade according to claim 1, wherein said fastener comprises a tension member arranged to provide tension in the longitudinal direction of the blade between the first blade section and the second blade section to establish a pre-tensioned connection between the blade sections.

16. The sectional blade according to claim 1, wherein the spar bridge forms an integral part of the spar section of the first blade section.

17. The sectional blade according to claim 1, wherein the spar bridge forms a separate member, and each of the spar sections of the first and second blade sections are adapted to receive the spar bridge so as to hold the spar bridge.

18. The sectional blade according to claim 17, wherein the spar sections of the first and second blade sections both comprise receiving sections extending from the blade joint and inwards into each of the spar sections, the receiving sections both holding the spar bridge such that movement of each end portions of the spar bridge relative to the corresponding receiving section is enabled in the longitudinal direction.

19. The sectional blade according to claim 17, wherein the spar bridge protruding from the one of the blade sections is bonded into the spar section in said one blade section.

20. The sectional blade section according to claim 1, wherein the blade joint facilitates disassembling of the blade sections from each other.

21. A method of manufacturing a sectional blade according to claim 1, the method comprising the steps of:
   providing a first blade section and a second blade section;
   arranging the blade sections so that they extend in opposite directions from a joint; and
   structurally connecting the blade sections by use of a spar bridge.

22. A wind turbine comprising a sectional blade according to claim 1.

* * * * *